United States Patent
Kumar et al.

(10) Patent No.: US 10,268,636 B2
(45) Date of Patent: Apr. 23, 2019

(54) COLUMN LEVEL INVALIDATION FOR IN-MEMORY DATABASE

(71) Applicant: Oracle International Corporation, Redwood Shores, CA (US)

(72) Inventors: Ankita Kumar, Bellevue, WA (US); Sanket Hase, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 15/268,458

(22) Filed: Sep. 16, 2016

(65) Prior Publication Data
US 2018/0081926 A1    Mar. 22, 2018

(51) Int. Cl.
G06F 16/00    (2019.01)
G06F 16/23    (2019.01)
G06F 16/22    (2019.01)
G06F 16/2455  (2019.01)
G06F 16/332   (2019.01)

(52) U.S. Cl.
CPC ...... *G06F 16/2365* (2019.01); *G06F 16/2237* (2019.01); *G06F 16/24552* (2019.01); *G06F 16/3329* (2019.01); *G06F 16/221* (2019.01); *G06F 16/2379* (2019.01)

(58) Field of Classification Search
CPC ......... G06F 17/30377; G06F 17/30315; G06F 17/30324; G06F 17/30371; G06F 17/3048
See application file for complete search history.

(56) References Cited

U.S. PATENT DOCUMENTS

| | | | | |
|---|---|---|---|---|
| 5,742,792 A | * | 4/1998 | Yanai | G06F 3/0601 710/1 |
| 5,884,325 A | * | 3/1999 | Bauer | G06F 17/30578 |
| 6,826,563 B1 | * | 11/2004 | Chong | G06F 17/30324 707/745 |
| 6,920,531 B2 | * | 7/2005 | Lyon | G06F 12/0891 711/138 |
| 9,128,972 B2 | | 9/2015 | Raja et al. | |
| 9,292,564 B2 | | 3/2016 | Kamp et al. | |
| 9,323,799 B2 | | 4/2016 | Hase et al. | |
| 9,483,517 B2 | | 11/2016 | Raja et al. | |
| 9,881,048 B2 | | 1/2018 | Kamp et al. | |
| 9,916,093 B2 | * | 3/2018 | Shim | G06F 3/0604 |
| 2009/0254516 A1 | * | 10/2009 | Meiyyappan | G06F 17/30492 |
| 2015/0088822 A1 | * | 3/2015 | Raja | G06F 17/30324 707/625 |
| 2015/0178329 A1 | * | 6/2015 | Andrei | G06F 17/30309 707/609 |
| 2015/0324145 A1 | * | 11/2015 | Akutsu | G06F 3/0617 711/114 |
| 2016/0085834 A1 | * | 3/2016 | Gleeson | G06F 17/30339 707/693 |
| 2016/0283558 A1 | * | 9/2016 | Wu | G06F 17/30356 |
| 2017/0147502 A1 | * | 5/2017 | Byun | G06F 12/1009 |

* cited by examiner

*Primary Examiner* — Merilyn P Nguyen
(74) *Attorney, Agent, or Firm* — Hickman Palermo Becker Bingham LLP

(57) ABSTRACT

Techniques are provided for maintaining and using row-level and column-level invalidation information for a copy of data items stored in-memory via a row-bitmap and column-bitmap. The row-bitmap and column-bitmap can be used to determine whether a database query can be processed using in-memory data or not. The row-bitmap and column-bitmap can thus improve the frequency with which database queries can be processed using in-memory data.

25 Claims, 11 Drawing Sheets

TABLE 200

|    | C1   | C2   | C3   |
|----|------|------|------|
| R1 | R1C1 | R1C2 | R1C3 |
| R2 | R2C1 | R2C2 | R2C3 |
| R3 | R3C1 | R3C2 | R3C3 |
| R4 | R4C1 | R4C2 | R4C3 |
| R5 | R5C1 | R5C2 | R5C3 |
| R6 | R6C1 | R6C2 | R6C3 |

COLUMN LEVEL INVALIDATION FOR IN-MEMORY DATABASE

TECHNICAL FIELD

The present disclosure relates to database systems. More specifically, the disclosure relates to tracking column level invalidation for in-memory data.

BACKGROUND

Accessing database data from volatile memory is significantly faster than accessing database data from disk. Given that volatile memory is becoming cheaper and larger, improvements to query processing are possible by improving the frequency of using volatile memory for fulfilling such queries rather than disk. Existing database systems maintain in-memory copies of data, as well as information that indicates which in-memory rows are invalid. If an in-memory row is marked as invalid, then at least one data item in the in-memory row is stale (i.e. does not reflect an update). When a database server needs to retrieve a data item from an in-memory row that has been marked as invalid, the database server must retrieve the data item from elsewhere (e.g. a buffer cache or disk) to ensure that the retrieved version of the data item reflects all updates. Unfortunately, this practice is inefficient when the in-memory copy of the desired data item is not in fact stale. However, with row-level invalidity, it is not possible to know which in-memory data items, within an invalid row, are not stale.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

Figure 1:
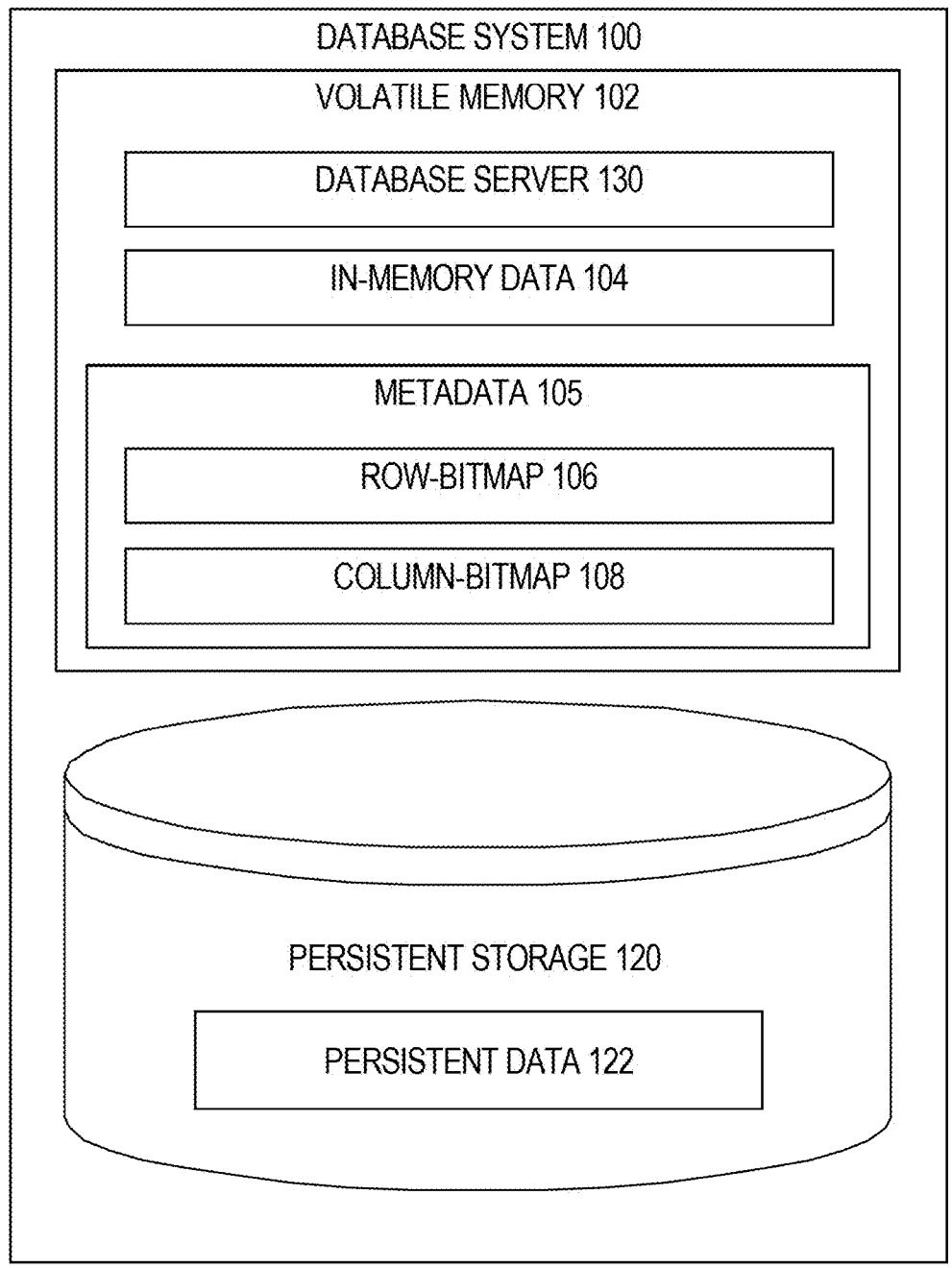
FIG. 1 is a block diagram of a database system for using row-level and column-level invalidation data, according to one embodiment.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

General Overview

A database system can access data items from persistent data stored on persistent storage, such as disk storage. For data that resides in tables within a database, each data item is associated with a particular row and a particular column. To speed up data retrieval operations, a database system can pre-load tabular data from disk into volatile memory. Such pre-loaded in-memory data (IM data) includes copies of data items that are stored on persistent storage. Accessing data items from IM data is more efficient than accessing the same data items from persistent storage. Thus, improving the frequency that data items are retrieved from IM data, as opposed to persistent data, can improve the performance of the database system.

Over time, IM data and the persistent data will become out of synchronization, as update transactions modify data items of the persistent data and invalidate the corresponding data items in the IM data. Row-level invalidation information may be maintained in a row-bitmap stored in volatile memory in order to identify whether a particular row includes an invalid data item. A system that uses a "changed row bitmap" to maintain row-level invalidation information is described in U.S. Pat. No. 9,292,564, the entire contents of which is incorporated herein by reference.

The techniques described herein involve maintaining column-level invalidation information, in addition to the row-level invalidation information. The column-level invalidation information may be maintained in a column-bitmap stored in volatile memory in order to identify whether a particular column segment of a column of data includes an invalid data item. By checking a column-bitmap before checking a row-bitmap, the database server can determine that an in-memory data item is not stale, even when the data item belongs to a row that has been marked invalid. When the data item from the invalid row is not stale, the IM copy of the data item may be used without having to revert to obtaining the data item from another source (e.g. from disk), thereby improving overall performance.

In one embodiment, the IM data is stored in a format that is independent of the persistent data in order to optimize performance. Thus, the IM data may be stored in a column-major format and the persistent data may be stored in a row-major format.

In one embodiment, the IM data is maintained transactionally consistent with the persistent data. The IM data is transactionally consistent in that any data items provided to a transaction from the IM data will be the same version that would have been provided if the data items were provided from the persistent data. Further, the version of the data item that is provided to a transaction reflects all changes that were committed before the snapshot time of the transaction, and no changes that were committed after the snapshot time of the transaction. Thus, when a transaction that made a change to a data item that is reflected in the IM data is committed, the change is made visible relative to both the persistent data and the IM data. On the other hand, if a transaction that made a change is aborted or rolled back, then the change is rolled back relative to both the persistent data and the IM data.

The IM data includes copies of data items that already exist in the persistent data. However, while all items in the IM data are copies of versions of corresponding items in the persistent data, not all items in the persistent data need to be included as copies in the IM data. Thus, the IM data may be a subset of the persistent data. Because not all of the persistent data is necessarily included as copies in the IM data, in some situations queries may require data that can only be satisfied by the persistent data. For example, if a table has columns A, B, and C, and only column A is included in the IM data, then a query that requires values from column B must obtain those values from the persistent data. However, even in those circumstances, the IM data may still be used to satisfy a portion of the query and/or speed up the retrieval of required data from the persistent data. For example, the IM data may be used to identify specific rows that must be retrieved from the persistent data.

In some embodiments, the IM data is compressed. The compression can be performed at various compression levels, either specified by the user or based on access patterns.

General Architecture

FIG. 1 is a block diagram of a database system according to one embodiment. Referring to FIG. 1, database system 100 includes volatile memory 102 and persistent storage 120. Volatile memory 102 generally represents the random access memory used by the database system 100, and may be implemented by any number of memory devices. Typically, data stored in volatile memory 102 is lost when a failure occurs. Accessing data from volatile memory 102 is faster and/or more efficient than accessing data from persistent storage 120.

Within volatile memory 102, a database server 130 is executing database commands that are submitted to the database server 130 by one or more database applications (not shown). The data used by those applications is illustrated as persistent data 122. Persistent data 122 includes data blocks which store the data of a given database. Persistent data 122 resides on persistent storage device 120. Persistent storage 120 generally represents any number of persistent storage devices, such as magnetic disks, FLASH memory, and/or solid state drives. Unlike volatile memory 102, data stored on persistent storage 120 is not lost when a failure occurs. Consequently, after a failure, the data on persistent storage 120 may be used to rebuild the data that was lost in volatile memory 102.

In various embodiments and implementations, the data blocks which store the data of a given database may be logically organized in various storage space structures (e.g., such as extents, segments, tablespaces, etc.) and may be physically allocated as raw hard disk blocks or as portions of Operating System (OS) data files. For example, the data of a database (e.g., such as relational or object-relational database) is logically organized in database objects (sometimes also referred to as "schema objects") that may include, but are not limited to, tables, views, sequences, stored procedures, indexes, and database links to other databases. Physically, the data of a database is stored on persistent storage device(s) in data blocks, where in various embodiments and implementations such data blocks may be physically stored as raw disk blocks directly on the persistent storage device(s) or may be stored in files that are stored on the persistent storage device(s). Depending on the number and data types of the data values that are stored in the data rows, a particular data block may store the data values from a single data row or may store the data values from multiple data rows, where the multiple data rows may logically belong to the same database object or to multiple different database objects. As an example, the data of a relational table may be logically organized in records, where each record includes one or more fields for storing data values from the corresponding one or more columns that are configured for the table. Physically, the data values in each data record may be stored as a data row in one or more data blocks that are stored in a file on a persistent storage device such as a hard disk. For example, in a relational table that stores employee data in three columns named "ID", "first name", and "last name", a particular data row can store values for an employee ID, a first name, and a last name for a particular employee.

Figures 2A, 2B:
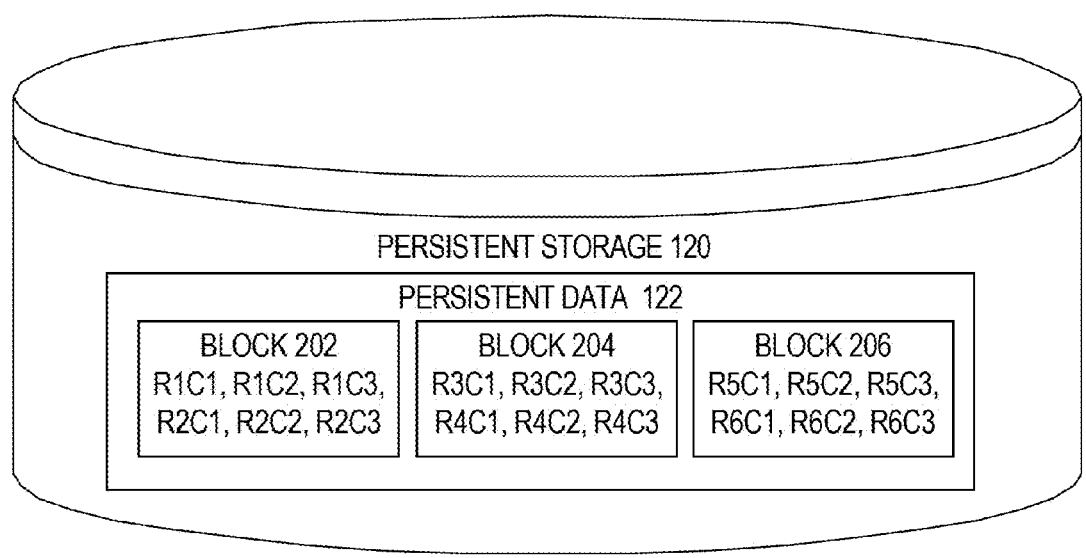
FIG. 2A is a block diagram of an example table, according to one embodiment.
FIG. 2B is a block diagram of an example persistent storage device, according to one embodiment.

For the purpose of explanation, it shall be assumed that persistent data 122 includes the table 200 illustrated in FIG. 2A. Table 200 includes three columns C1-C3, and six rows R1-R6. While the illustration of table 200 in FIG. 2A portrays how the persistent data 122 is logically organized on persistent storage 120, the actual format in which the data is physically stored may be quite different. For example, FIG. 2B illustrates one embodiment of how the data that resides in table 200 may be physically organized in persistent storage 120. In the present example, the data for table 200 is stored in three row-major disk blocks 202, 204, and 206. Block 202 stores the values for all columns of row R1, followed by the values for all columns of row R2. Block 204 stores the values for all columns of row R3, followed by the values of all columns of row R4. Finally, block 206 stores the values of all columns of row R5, followed by the values of all columns of row R6.

In-Memory Data

Volatile memory 102 further includes IM data 104 which is an in-memory copy of at least a subset of persistent data 122. IM data 104 may be stored in the same or a different physical layout as persistent data 122. For example, IM data may be physically organized as row-major blocks, column-major blocks, or some combination thereof. In one embodiment, IM data 104 may be compressed or stored as in-memory compression units (IMCUs). Further details regarding the format of IM data is described in U.S. patent application Ser. No. 14/337,179 ("Mirroring, In Memory, Data From Disk To Improve Query Performance"), now U.S. Pat. No. 9,292,564, the entire contents of which are incorporated by reference.

Data accesses for data items in IM data 104 are faster than data accesses for data items in persistent data 122. Thus, it is preferable to perform data accesses for data items in IM data 104 wherever possible.

In one embodiment, IM data 104 may be a local copy of only a subset of persistent data 122. For example, IM data 104 may only include frequently-accessed tables and/or columns from persistent data 122, thereby improving data accesses for frequently-accessed subsets of persistent data 122.

Metadata

To determine whether the IM data 104 contains the data items required to process a query, and if so, to find the data items in the IM data 104 required to process the query, the database server 130 needs to know which data items are included in the IM data 104. Therefore, according to one embodiment, metadata 105 is maintained in volatile memory 102.

In one embodiment, metadata 105 includes a mapping to indicate which parts of persistent data 122 are contained in IM data 104. This indication may be made in a variety of ways, including storing data that indicates one or more of the following: the table(s) whose data is stored in the IM data; the column(s) whose data is stored in the IM data; the range of rows stored in the IM data; the range of disk blocks whose data is stored in the IM data; the segments whose data is stored in the IM data; the table partitions whose data is stored in the IM data; the extents whose data is stored in the IM data; the manner in which the data in the IM data has been compressed, if at all; the dictionary for decompressing the data stored in the IM data when a dictionary-type encoding has been used to compress the IM data; and/or the physical layout of the data stored in the IM data.

In one embodiment, metadata 105 includes a latest version timestamp that indicates when the IM data 104 was last initialized or repopulated based on persistent data 122. This information can be used to determine how old the IM data 104 is and when it was last updated.

The changes made by update transactions that modify data items in persistent data 122 will not be reflected in IM data 104. Thus, over time, the contents of IM data 104 and persistent data 122 may differ. Metadata 105 further includes row-bitmap 106 and column-bitmap 108 in order to track what data items of IM data 104 are "dirty" or invalid, and what data items of IM data 104 are "clean" or valid. A data item in the IM data 104 becomes invalid or stale when a change is committed to the data item in persistent data 122, but the change is not committed to the corresponding copy of the data item in IM data 104. Further details regarding row-bitmap 106 and column-bitmap 108 will be described herein.

In one embodiment, metadata 105 may store transaction update records which indicate information about what rows and/or columns of data items in IM data 104 have been modified by a particular transaction update. In one embodiment, these transaction update records can be used to maintain or update the row-bitmap 106 and/or column-bitmap 108 after a transaction is committed.

In one embodiment, metadata 105 may include an insert bit and/or a delete bit. The insert bit indicates that an insert transaction has been committed that has added a new row of data that has not been reflected in IM data 104. The delete bit indicates that a delete transaction has been committed that has deleted a row of data in IM data 104.

Row-Bitmap

A row-bitmap 106 is a bitmap that includes row-level invalidation information that indicates the rows for which the IM data 104 has values that have been modified by transactions committed since the latest version timestamp of the IM data 104. Each bit of row-bitmap 106 corresponds to a row of data and indicates whether the row contains any invalid (stale) data item. Row-bitmap 106 may be used to indicate which data items in IM data 104 are invalid. For example, when the IM data 104 is initialized or repopulated from persistent data 122, all the data items in IM data 104 are updated, and therefore will initially match the corresponding data items in persistent data 122. At the same time that IM data 104 is initialized or repopulated, the latest version timestamp, maintained in metadata 105, is updated with the current timestamp and every bit in row-bitmap 106 is reset to indicate that all data items are valid.

Over time, transactions may modify data items in persistent data 122 without modifying the corresponding data items in IM data 104. Thus, some data items in IM data 104 may differ from the corresponding data items in persistent data 122. Rather than purge all the data items in IM data 104 as invalid, the row-bitmap 106 may be used to identify which data items in IM data 104 are valid or invalid.

For example, when a transaction performs an update to data items in rows R2, R4, and R6 of table 200, the row-bitmap 106 may be updated by setting the corresponding bits that correspond to rows R2, R4, and R6 to indicate that those rows have been modified and are no longer valid in IM data 104.

Figure 3:
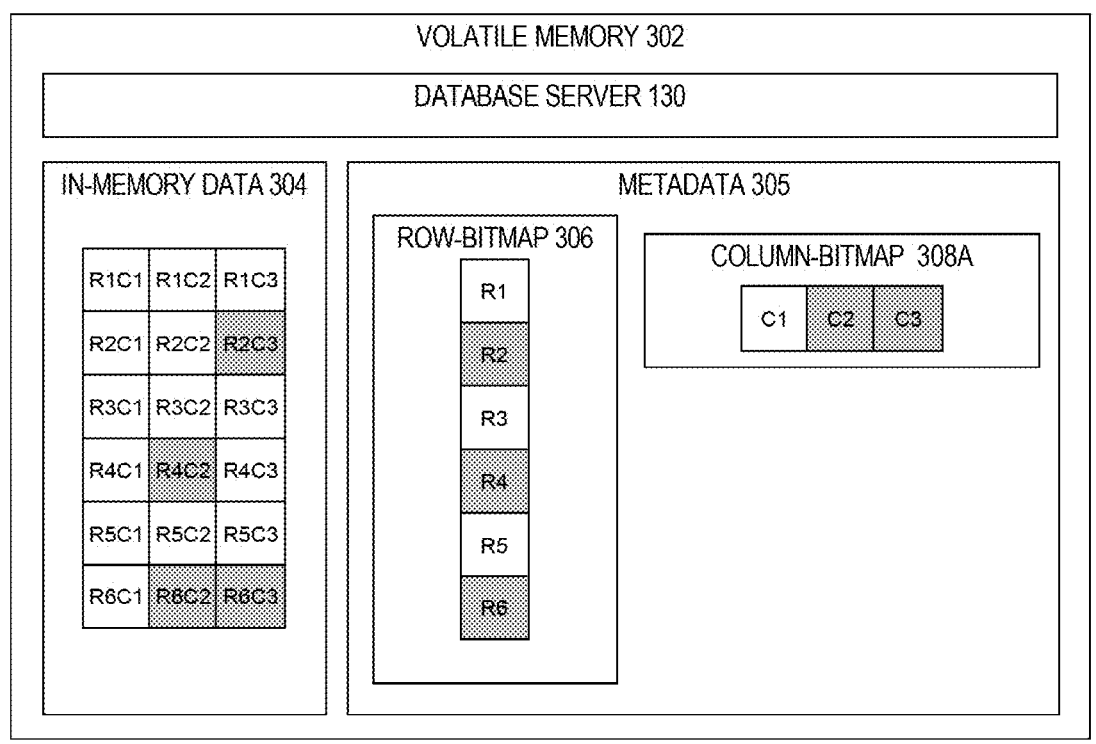
FIG. 3 is a block diagram of volatile memory of a database system for using row-level and column-level invalidation data, according to one embodiment.

FIG. 3 illustrates an example of volatile memory 302, according to one embodiment. Volatile memory 302 includes database server 130, IM data 304, metadata 305, row-bitmap 306, and column-bitmap 308A. In this example, IM data 304 is depicted as logically organized as a table for purposes of explanation. However, as explained earlier, IM data 304 may be physically organized in a different format, such as row-major blocks or column-major blocks. In FIG. 3 and the other figures of this disclosure, a grey shaded background for a data item or bit indicates that the data item or bit is invalid, whereas a white background for a data item or bit indicates that the data item or bit is valid. In this example, IM data 304 includes data items R2C3, R4C2, R6C2, and R6C3 that are marked as invalid, as depicted with the shading of these data items. Row-bitmap 306 includes bits that correspond to each row of data in IM data 304. In this example, row-bitmap 306 includes bits R1, R2, R3, R4, R5, and R6, where each bit indicates whether at least one data item in the given row is invalid. Thus, in this example, row-bitmap 306 indicates that rows R2, R4, and R6 contain an invalid data item, and that rows R1, R3, and R5 do not contain an invalid data item.

In one embodiment, a single row-bitmap is maintained for IM data 304. In another embodiment, a separate row-bitmap is maintained for a set of data items stored in IM data 304, such as a data block.

Row-bitmap 306 can be used, by itself, to determine whether a row of data in IM data 304 contains an invalid data item in order to determine whether to process a query using IM data 304 or persistent data 122. However, solely relying on row-bitmap 306 will result in some queries using persistent data 122 when IM data 304 contains valid data items for the query. For example, in FIG. 3, all of the data items for column C1 are valid. However, if database server 130 receives a query that accesses only the data items in column C1, database server 130 will still process the query using persistent data 122 to process at least part of the query because row-bitmap 306 indicates that rows R2, R4, and R6 contain invalid data items. However, IM data 304 could have been used to process the entire query because all of the data items in column C1 are valid in FIG. 3.

Column-Bitmap

According to one embodiment, even when the row bitmap 306 indicates that a particular row is invalid, the database server 130 may use in-memory data of that row as long as the appropriate bit in a column-bitmap indicates that the data item is valid. In the embodiment illustrated in FIG. 3, database server 130 uses column-bitmap 308A to determine whether data items in IM data 304 are valid or not.

Specifically, according to one embodiment, each bit in a column-bitmap 308A corresponds to a column segment of a different column. A column segment corresponds to a set of data. The set of data to which a column segment belongs is said to be "covered" by the column segment. If any data in a column segment is stale, then the bit that corresponds to the column segment is set to indicate that the column segment is invalid. In one embodiment, the size of a column-bitmap is equal to the number of columns of data in the IM data, as each bit in the column-bitmap corresponds to a column segment from a different column of data in the IM data.

Column Segments

As explained above, each bit in a column-bitmap corresponds to a column segment and indicates whether the set of data covered by the column segment includes any stale item. The granularity of a column segment can vary based on implementation. For example, a column segment may cover: a single data item from a column, a subset of data items in a column, or all of the data items in a column. Thus, at the finest level of granularity, a column segment can cover a single column/row combination (e.g. row 1, column 1 of table 200). At the coarsest level of granularity, a column segment can cover the entirety of one column of a table (e.g. the entirety of column C1 of table 200). For the purpose of explanation, examples shall be given hereafter in which each column segment covers no more than one single column.

By increasing the granularity of the column segments, more details regarding the invalidation state of the data items can be maintained in the column-bitmap(s). Using coarse-granularity column segments requires less storage of data in the column-bitmap(s) because each bit covers more data. Using coarse-granularity column segments also decreases overhead processing needed to maintain the column-bitmap(s). On the other hand, using fine-granularity column segments requires more storage of data in the column-bitmap(s) and incurs more overhead processing to maintain the column-bitmap(s). However, using fine-granularity column segments increases the frequency with which IM data is used to process queries instead of persistent data.

In the embodiment illustrated in FIG. 3, each bit of column-bitmap 308A corresponds to a column segment that covers an entire column of table 200. Likewise, each bit of column-bitmap 308A corresponds to a different column of data from table 200. Specifically, column-bitmap 308A includes a single bit that corresponds to a column segment that covers all data items in column C1. As illustrated in FIG. 3, that single bit is not shaded, thereby indicating that column C1 does not contain any invalid data items.

Likewise, column-bitmap 308A further includes a second bit that corresponds to a column segment that covers all data items in column C2. As illustrated in FIG. 3, that single bit is shaded, indicating that column C2 contains an invalid data item.

Additionally, column-bitmap 308A further includes a third bit that corresponds to a column segment that covers all data items in column C3. In FIG. 3, that bit is shaded, thereby indicating that column C3 contains an invalid data item.

As mentioned above, rather than covering the entirety of a column, a column segment may cover multiple data items from a particular column, but not all data items from the particular column. For example, a column segment may correspond to an IMCU, a data block, or a set of one or more data blocks.

Figure 4:
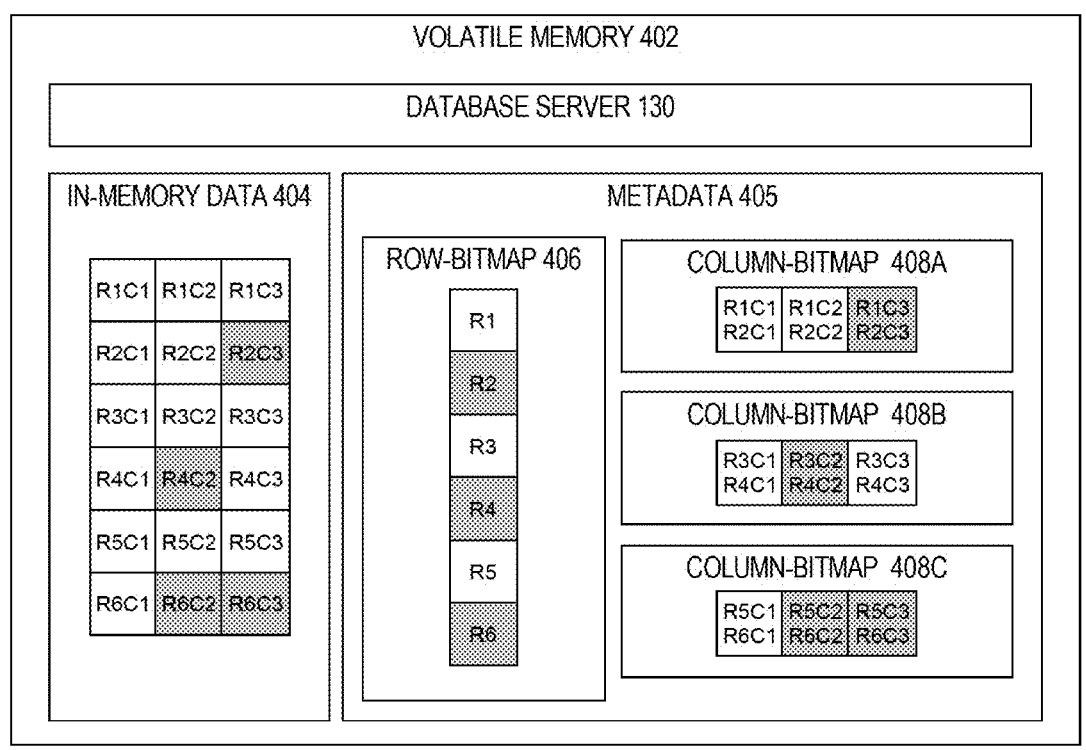
FIG. 4 is a block diagram of volatile memory of a database system for using row-level and column-level invalidation data, according to one embodiment.

FIG. 4 illustrates an embodiment where each column segment covers multiple data items from a particular column but not all data items from the particular column. Volatile memory 402 includes database server 130, IM data 404, row-bitmap 406, and column-bitmaps 408A, 408B, and 408C. In this example, IM data 404 includes data items R2C3, R4C2, R6C2, and R6C3 that are invalid, as depicted with the shading of these data items in IM data 404. The remaining data items in IM data 404 are valid. Column-bitmaps 408A, 408B, and 408C each correspond to data blocks 202, 204, and 206, respectively.

Column-bitmap 408A includes three bits that each correspond to column segments for block 202. The first bit of column-bitmap 408A corresponds to a column segment of column C1 that covers data items from block 202. Specifically, the first bit of column-bitmap 408A corresponds to a column segment of column C1 that covers data items R1C1 and R2C1. The second bit of column-bitmap 408A corresponds to a column segment of column C2 that covers data items from block 202. Specifically, the second bit of column-bitmap 408A corresponds to a column segment of column C2 that covers data items R1C2 and R2C2. The third bit of column-bitmap 408A corresponds to a column segment of column C3 that covers data items from block 202. Specifically, the third bit of column-bitmap 408A corresponds to a column segment of column C3 that covers data items R1C3 and R2C3. The respective bits of column-bitmap 408A are marked as valid or invalid, as depicted with the shading of the bit.

Column-bitmap 408B includes three bits that each correspond to column segments for block 204. The first bit of column-bitmap 408B corresponds to a column segment of column C1 that covers data items from block 204. Specifically, the first bit of column-bitmap 408B corresponds to a column segment of column C1 that covers data items R3C1 and R4C1. The second bit of column-bitmap 408B corresponds to a column segment of column C2 that covers data items from block 204. Specifically, the second bit of column-bitmap 408B corresponds to a column segment of column C2 that covers data items R3C2 and R4C2. The third bit of column-bitmap 408B corresponds to a column segment of column C3 that covers data items from block 204. Specifically, the third bit of column-bitmap 408B corresponds to a column segment of column C3 that covers data items R3C3 and R4C3. The respective bits of column-bitmap 408B are marked as valid or invalid, as depicted with the shading of the bit.

Column-bitmap 408C includes three bits that each correspond to column segments for block 206. The first bit of column-bitmap 408C corresponds to a column segment of column C1 that covers data items from block 206. Specifically, the first bit of column-bitmap 408C corresponds to a column segment of column C1 that covers data items R5C1 and R6C1. The second bit of column-bitmap 408C corresponds to a column segment of column C2 that covers data items from block 206. Specifically, the second bit of column-bitmap 408C corresponds to a column segment of column C2 that covers data items R5C2 and R6C2. The third bit of column-bitmap 408C corresponds to a column segment of column C3 that covers data items from block 206. Specifically, the third bit of column-bitmap 408C corresponds to a column segment of column C3 that covers data items R5C3 and R6C3. The respective bits of column-bitmap 408C are marked as valid or invalid, as depicted with the shading of the bit.

As can be seen, the implementation of FIG. 4 provides a finer granularity for tracking column-level invalidation data than the implementation in FIG. 3.

Figure 5:
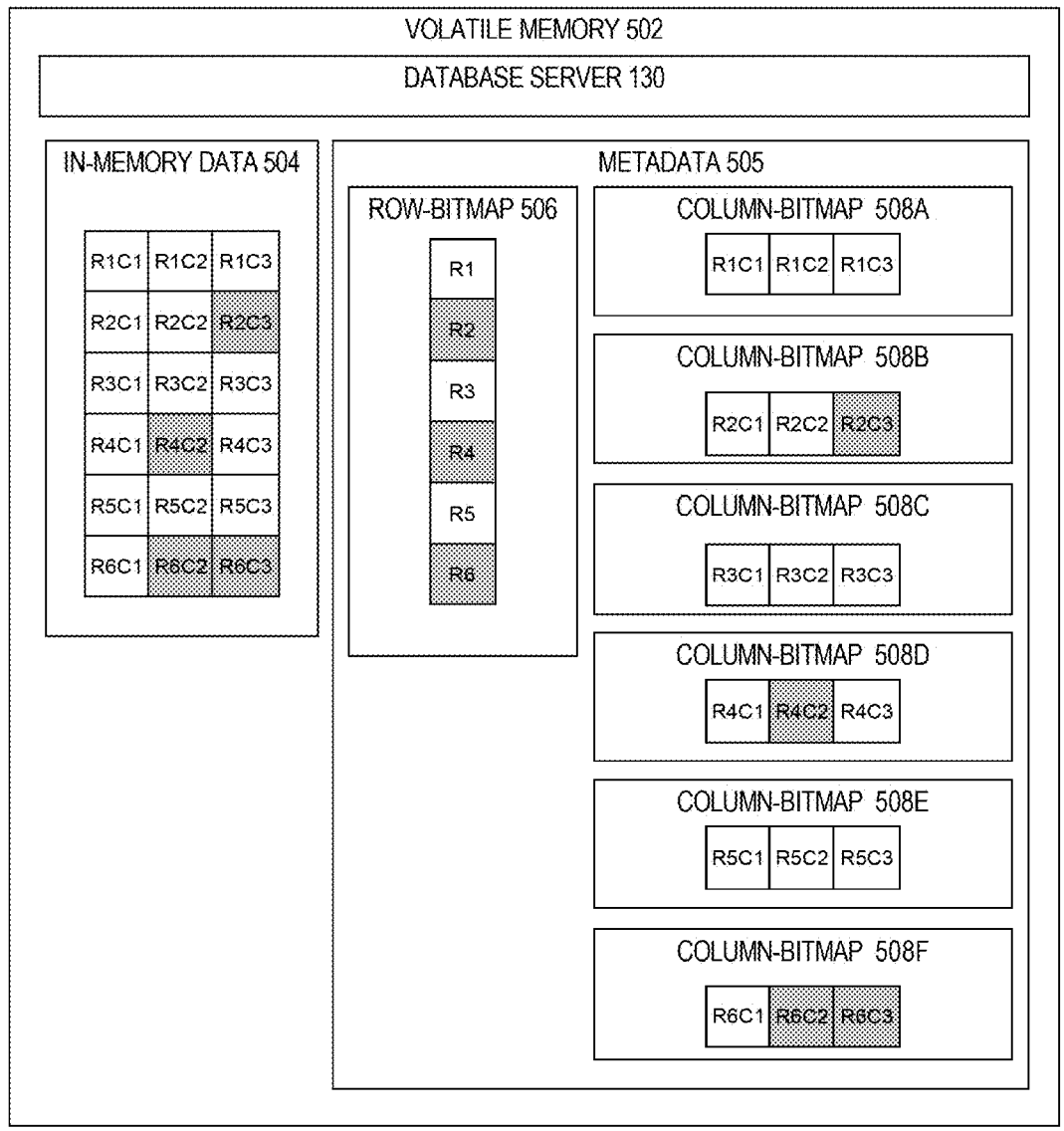
FIG. 5 is a block diagram of volatile memory of a database system for using row-level and column-level invalidation data, according to one embodiment.

FIG. 5 illustrates an embodiment where each column segment covers a single data item from a particular column. FIG. 5 illustrates an example of volatile memory 502, according to one embodiment. Volatile memory 502 includes database server 130, IM data 504, row-bitmap 506, and column-bitmaps 508A, 508B, 508C, 508D, 508E, and 508F. In this example, IM data 504 includes data items R2C3, R4C2, R6C2, and R6C3 that are invalid, as depicted with the shading of these data items in IM data 504. The remaining data items in IM data 504 are valid. Column-bitmaps 508A, 508B, 508C, 508D, 508E, and 508F each correspond to a particular row R1, R2, R3, R4, R5, and R6, respectively, and thus can be used to track the validity of a particular data item at a row/column combination. Column-bitmap 508A includes three bits that each correspond to column segments of row R1. The first bit of column-bitmap 408A corresponds to a column segment of column C1 that covers data item R1C1, the second bit of column-bitmap 508A corresponds to a column segment of column C2 that covers data item R1C2, the third bit of column-bitmap 508A corresponds to a column segment of column C3 that covers data item R1C3. Thus, each of the bits of column-bitmap 508A covers a column segment that includes a single data item from a particular column and from row R1. Column-bitmaps 508B, 508C, 508D, 508E, and 508F similarly have bits where each bit covers a single data item from a particular column for row R2, R3, R4, R5, or R6, respectively. The respective bits of column-bitmaps 508A, 508B, 508C, 508D, 508E, and 508F are marked as valid or invalid, as depicted with the shading of the bit. As can be seen, the implementation of FIG. 5 provides an even finer granularity for tracking column-level invalidation data than the implementation in FIG. 3 or FIG. 4.

In each of the examples FIG. 4 and FIG. 5, the column-level invalidation data is represented as multiple single-dimension column-bitmaps wherein each column-bitmap maintains data on a subset of the IM data, and each bit of each column-bitmap corresponds to a single column of data. For example, FIG. 4 features three single-dimension column-bitmaps 408A, 408B, and 408C. However, in another embodiment, the same invalidation information may be captured in a single column-bitmap instead of multiple column-bitmaps. For example, the single column-bitmap may be two-dimensional instead of multiple single-dimensional column-bitmaps.

Initializing IM Data

Figure 6:
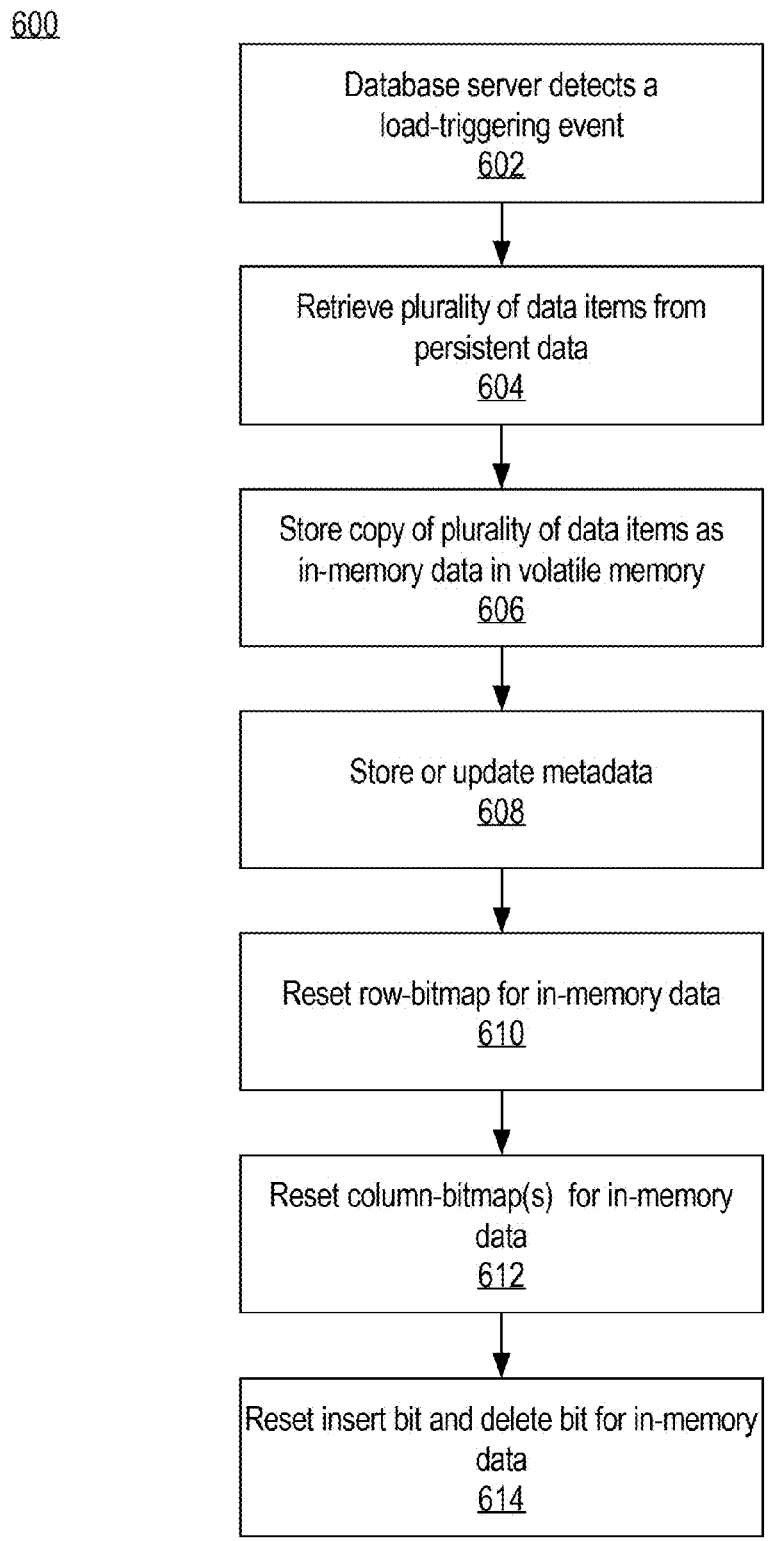
FIG. 6 is a flow diagram for a process for initializing in-memory data, according to one embodiment.

FIG. 6 illustrates an example computer-implemented process 600 for initializing IM data 104 in a database system 100 according to one embodiment.

In step 602, database server 130 detects a load-triggering event. A load-triggering event is any event that can cause IM data 104 to initialize from persistent data 122. For example, a load-triggering event may be detected when database server 130 initializes, or when the database server 130 determines that certain subsets of persistent data 122 are being frequently accessed and would benefit from being stored in IM data 104. Once database server 130 detects a load-triggering event, the process 600 may proceed to step 604.

In step 604, the process retrieves a plurality of data items from persistent data 122. In one embodiment, all of the data items from persistent data 122 are retrieved. In another embodiment, a subset of the data items from persistent data 122 are retrieved. For example, in one embodiment, particular tables, rows, disk blocks, are retrieved if they are frequently-accessed. In one embodiment, the subset of data items that are retrieved from persistent data 122 may be configurable by a database administrator via a database configuration setting. The process 600 may then proceed to step 606.

In step 606, the process may store a copy of the plurality of data items that were previously retrieved into IM data 104. The storage of the copy of the plurality of data items will allow the database server 130 to access the copies of the plurality of data items directly from volatile memory instead of requiring access to persistent storage 120. Accordingly, the storage of the copy of the plurality of data items into IM data 104 can improve system efficiency. The process 600 may then proceed to step 608.

In step 608, the process may store metadata 105. For example, the process may store metadata 105 with a latest version timestamp to indicate when the IM data 104 was last synchronized with persistent data 122. The process may store additional metadata 105 that includes a mapping to indicate which parts of persistent data 122 are contained in IM data 104 or how the data items in IM data 104 are physically or logically organized. The process 600 may then proceed to step 610.

In step 610, the process may initialize or reset the row-bitmap 106 to indicate that all the data items in IM data 104 are valid. The process 600 may then proceed to step 612.

In step 612, the process may initialize or reset the column-bitmap(s) 108 to indicate that all the data items in IM data 104 are valid. The process 600 may proceed to step 614.

In step 614, the process may initialize or reset the insert bit and delete bit to indicate that the persistent data 122 has not had an insert or delete transaction since the last time IM data 104 was initialized or repopulated. The process 600 may then end.

Maintaining Validity Information

Figure 7:
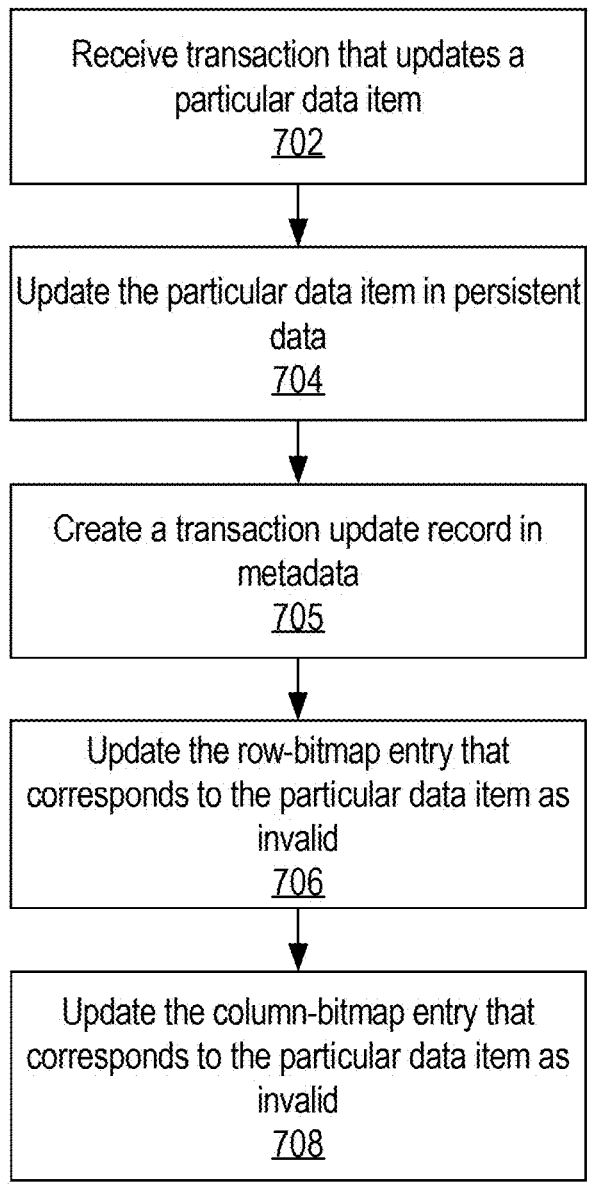
FIG. 7 is a flow diagram for a process for maintaining in-memory data, according to one embodiment.

FIG. 7 illustrates an example computer-implemented process 700 for maintaining validity information regarding IM data 104 in a database system 100, according to one embodiment.

In step 702, database server 130 receives a transaction that updates a particular data item. For example, the transaction may be an update transaction that modifies a particular data item that corresponds to a particular row and a particular column. The process 700 then proceeds to step 704.

In step 704, the process updates the particular data item in persistent data 122. The process 700 then proceeds to step 705.

In step 705, the process may optionally create a transaction update record in metadata 105 that identifies what rows and/or what columns were updated by the transaction. The process 700 then proceeds to step 706.

In step 706, the process updates the bit in the row-bitmap that corresponds to the particular row of the particular data item in IM data 104 to indicate that the particular row contains an invalid data item. The database server can, at a later time, use the bit in the row-bitmap to determine that the particular row contains an invalid data item. In one embodiment, this step is performed by using the transaction update record to identify the bit in the row-bitmap that corresponds to the particular row of the particular data item in IM data 104 that is modified by the transaction. The process 700 then proceeds to step 708.

In step 708, the process updates the bit, in the column-bitmap, that corresponds to a column segment that covers the particular data item to indicate that the column segment contains an invalid data item. The database server can, at a later time, use the bit in the column-bitmap to determine that the particular column segment covering the particular data item contains an invalid data item. In one embodiment, this step is performed by using the transaction update record to identify the bit in the column-bitmap that corresponds to the column segment of the particular column that covers the particular data item that is modified by the transaction. The process 700 then ends.

Using the IM Data to Process Queries

Figure 8:
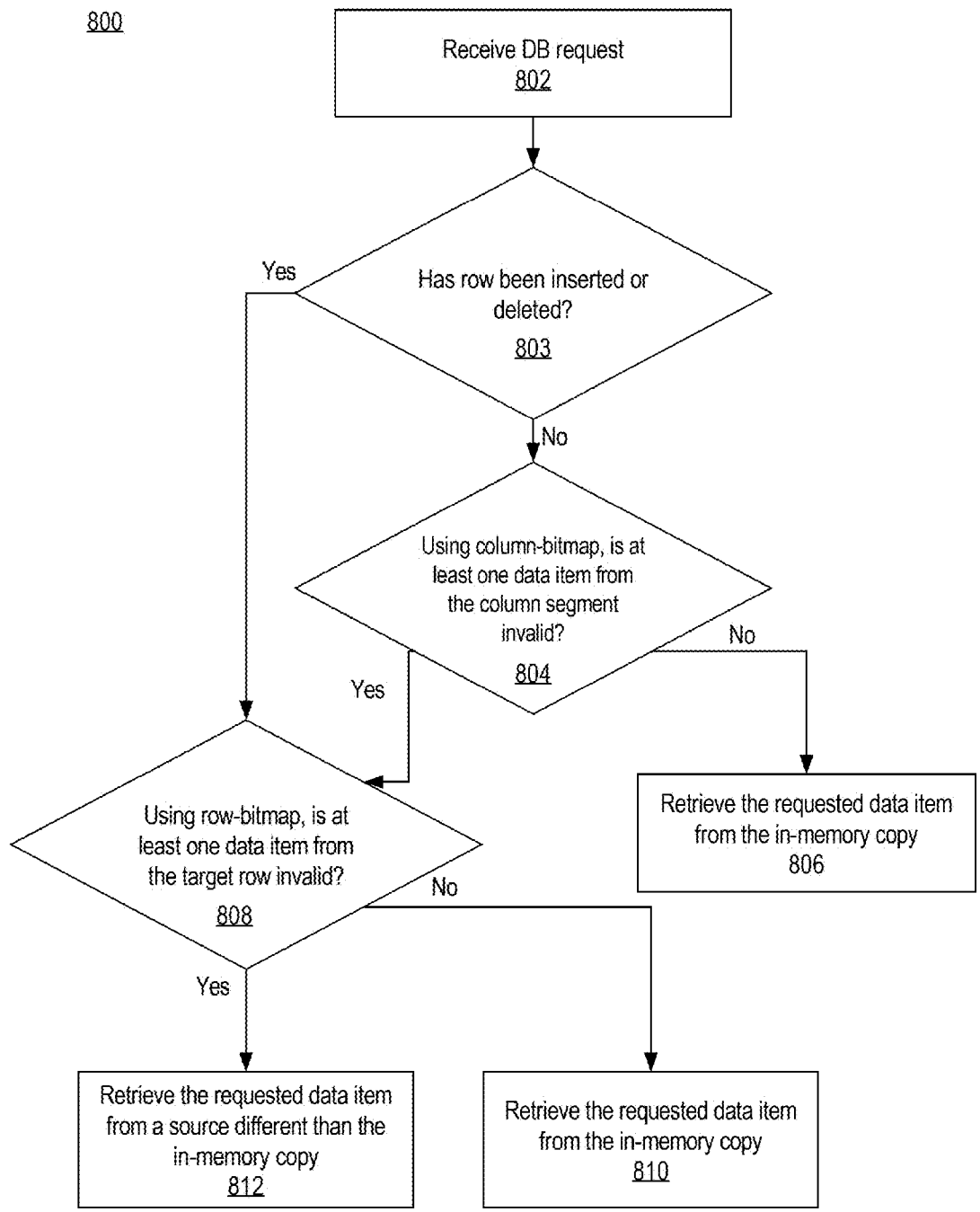
FIG. 8 a flow diagram for a process for processing a query using in-memory data, according to one embodiment.

FIG. 8 illustrates an example computer-implemented process 800 for processing a query using IM data 104 in a database system 100, according to one embodiment.

In step 802, database server 130 receives a database request that requires access to at least one requested data item, located at a target row and a target column. The data request can be any sort of read query, such as a scan query. The process then proceeds to step 803.

In step 803, the process 800 determines, using the insert bit and delete bit, whether a row has been inserted or deleted in persistent data 122 since the time when IM data 104 was last initialized or repopulated from persistent data 122. If either the insert bit or the delete bit is set to indicate that an insert or delete has occurred, the process proceeds to step 808, because the column-bitmap will no longer be accurate. If neither the insert bit nor the delete bit is set to indicate that an insert or delete has occurred, the process proceeds to step 804 to check the column-bitmap.

In step 804, the process 800 determines, using the column-bitmap, whether at least one data item from the column segment that covers the requested data item is invalid. If no data items from the column segment that covers the requested data item is invalid, then the process may proceed to step 806. If at least one data item from the column segment that covers the requested data item is invalid, then the process may proceed to step 808.

In step 806, since it has been determined that the column segment that covers the requested data item does not contain any invalid data items, the process 800 can retrieve the requested data item from IM data 104. Thus, the process will provide improved efficiency by allowing the database server 130 to process the request using IM data 104, even though the row-bitmap may potentially have invalid data items for the target row. This is possible because the column-bitmap is used to determine that the requested data item in the column segment of the target column is valid, even though the row-bitmap may indicate that the target row associated with the requested data item has an invalid data item in a different column than the target column. The process 800 may then end.

In step 808, the process 800 cannot yet retrieve the requested data item from IM data 104. Instead, a check needs to be made against the row-bitmap. In step 808 the process 800 thus determines, using the row-bitmap for the target row, whether at least one data item from the target row is invalid. If no data items from the target row is invalid, then the process may proceed to step 810. If at least one data item from the target row is invalid, then the process proceeds to step 812.

In step 810, since it has been determined that the target row does not contain any invalid data items, the process 800 can retrieve the requested data item from IM data 104. The process 800 may then end.

In step 812, since it has been determined that the target row does contain an invalid data item, the process 800 cannot retrieve the requested data item from IM data 104. Therefore, the process 800 retrieves the requested data item from a source different than the IM data 104. For example, the process 800 may retrieve the requested data item from persistent data 122 or separate buffer cache. The process 800 may then end.

In one embodiment, a database request may request multiple data items, where only a subset of the requested data items are valid in IM data 104, and the other data items must be retrieved from a source other than the IM data 104. In this example, the database server 130 can retrieve the subset of the data items that are valid from IM data 104, and can retrieve the remaining data items form a source other than IM data 104, such as persistent data 122 or a buffer cache.

Repopulating IM Data

Figure 9:
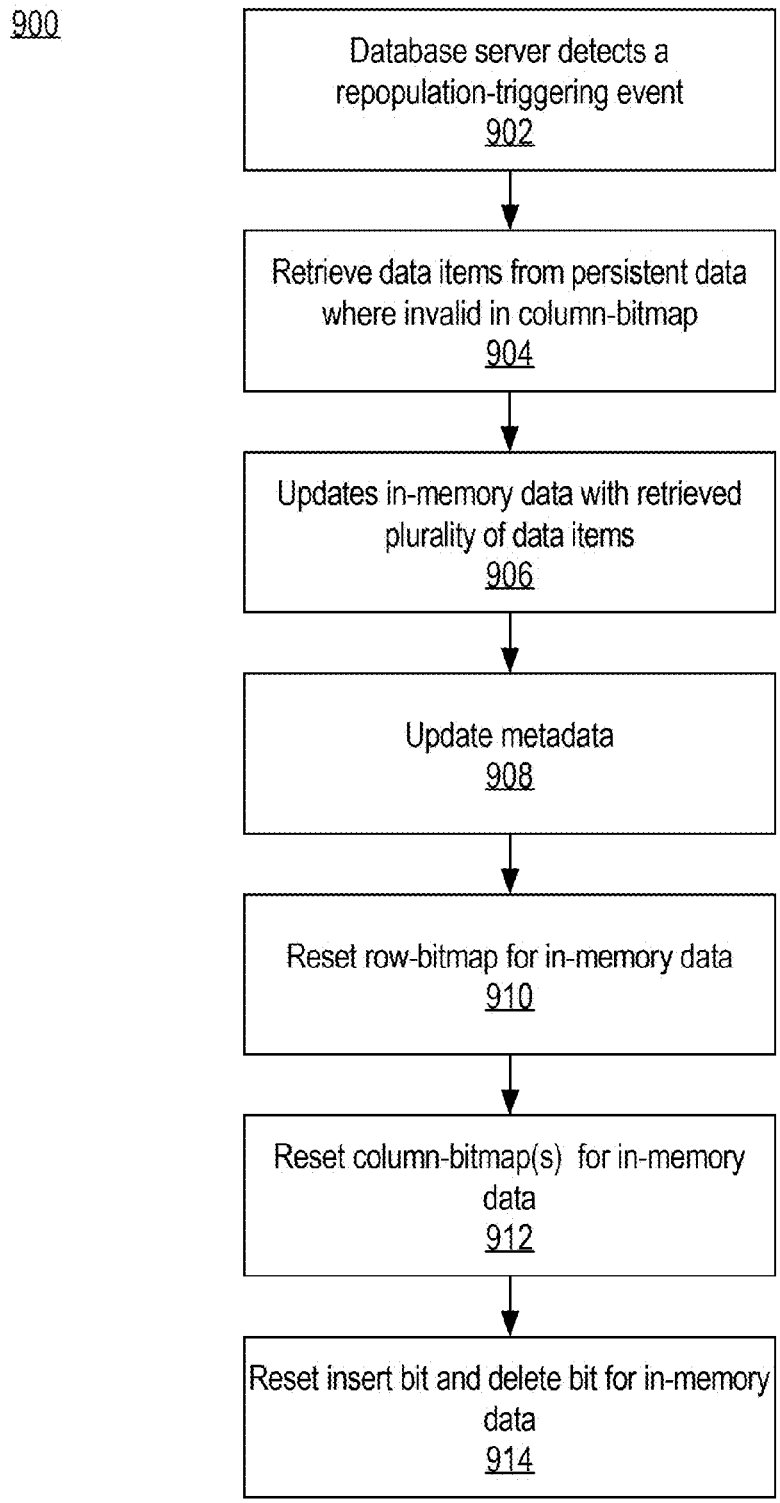
FIG. 9 is a flow diagram for a process for repopulating in-memory data, according to one embodiment.

Over time, the contents of IM data 104 will progressively become further out of synchronization with persistent data 122. FIG. 9 illustrates an example computer-implemented process 900 for repopulating IM data 104 in a database system 100 according to one embodiment.

In step 902, database server 130 detects a repopulation-triggering event. A repopulation-triggering event is any event that can cause IM data 104 to repopulate from persistent data 122. For example, a repopulation-triggering event may be detected when database server 130 determines that the latest version timestamp is too old, when the database server 130 determines that a percentage of the IM data 104 is invalid, or when the database server 130 determines that a certain number of transactions have been committed since the latest version timestamp. Once database server 130 detects a repopulation-triggering event, the process 900 may proceed to step 904.

For column-bitmap bits that are marked as valid, the database server 130 does not need to repopulate the data from the persistent data 122, as column-bitmap 108 indicates that those portions of the data items in IM data 104 are still valid. Thus, in step 904, the database server 130 identifies what data items in IM data 104 require repopulation by excluding those data items that are already identified as valid in the column-bitmap 108. The process 900 retrieves a plurality of data items from persistent data 122, using the column-bitmap so that it only retrieves data items that were identified as invalid in the column-bitmap 108. Thus, the repopulation process is improved as it does not require retrieving all data items from persistent data 122. Instead, only a subset of data items need to be retrieved, as determined by analyzing the column-bitmap. The process 900 may then proceed to step 906.

In step 906, the process updates IM data 104 with a copy of the plurality of data items that were previously retrieved in step 904. The process 900 may then proceed to step 908.

In step 908, the process may update metadata 105. For example, the process may update metadata 105 with a latest version timestamp to indicate when the IM data 104 was last synchronized with persistent data 122. The process may store additional metadata 105 that includes a mapping to indicate which parts of persistent data 122 are contained in IM data 104 or how the data items in IM data 104 are physically or logically organized. The process 900 may then proceed to step 910.

In step 910, the process may reset the row-bitmap 106 to indicate that all the data items in IM data 104 are valid. The process 900 may then proceed to step 912.

In step 912, the process may reset the column-bitmap(s) 108 to indicate that all the data items in IM data 104 are valid. The process 900 may proceed to step 914.

In step 914, the process may initialize or reset the insert bit and delete bit to indicate that the persistent data 122 has not had an insert or delete transaction since the last time IM data 104 was repopulated or initialized. The process 900 may then end.

Consistent Reads

In one embodiment, metadata 105 may include data that allows database server 130 to recreate an interim state of the row-bitmap 106 and column-bitmap 108 at some point in time prior to the current time and after the latest version timestamp. The interim state of the row-bitmap 106 and column-bitmap 108 can be used to process queries that were sent to the database server 130 at the interim time.

For example, assume that time T0 is less than time T1, which is less than time T2, which is less than time T4. Further, assume IM data 104 was repopulated at time T0. At time T1, Transaction A was received and began processing. At time T2, Transaction B was received, but did not begin processing because Transaction A was still processing and was using most of the system resources. At time T3, Transaction A completed. At time T4, Transaction B began processing. Since Transaction B was received at time T2, it will need to be processed using the interim state of the database at time T2, even though the processing of the request only occurs at time T4. By using metadata 105, database server 130 can recreate the state of the row-bitmap 106 and column-bitmap 108 at time T2 to determine whether the requested data items in Transaction B can be processed using IM data 104 or whether they require access to persistent data 122.

In one embodiment, when the interim state of the database at time T2 is unavailable, the database system can use the next available interim state to determine whether the requested data items in Transaction B can be processed using IM data 104 or whether they require access to persistent data 122. The next available interim state can be any available interim state that occurs later than time T2.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

Figure 10:
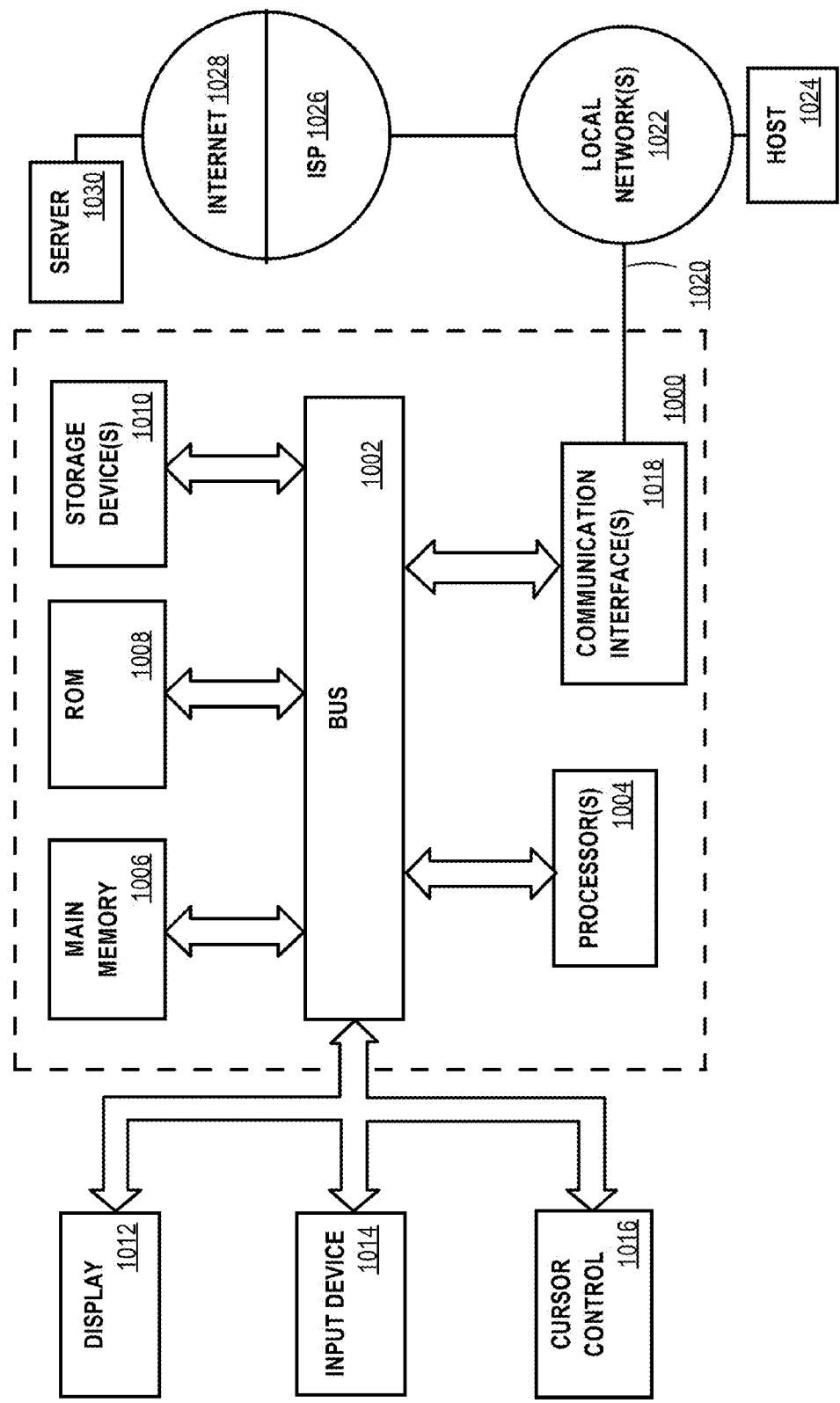
FIG. 10 is a block diagram of a computing device in which the example embodiment(s) of the present invention may be embodied.

Referring now to FIG. 10, it is a block diagram that illustrates a computing device 1000 in which the example embodiment(s) of the present invention may be embodied. Computing device 1000 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1000 may include a bus 1002 or other communication mechanism for addressing main memory 1006 and for transferring data between and among the various components of device 1000.

Computing device 1000 may also include one or more hardware processors 1004 coupled with bus 1002 for processing information. A hardware processor 1004 may be a general purpose microprocessor, a system on a chip (SoC), or other processor.

Main memory 1006, such as a random access memory (RAM) or other dynamic storage device, also may be coupled to bus 1002 for storing information and software instructions to be executed by processor(s) 1004. Main memory 1006 also may be used for storing temporary variables or other intermediate information during execution of software instructions to be executed by processor(s) 1004.

Software instructions, when stored in storage media accessible to processor(s) 1004, render computing device 1000 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1000 also may include read only memory (ROM) 1008 or other static storage device coupled to bus 1002 for storing static information and software instructions for processor(s) 1004.

One or more mass storage devices 1010 may be coupled to bus 1002 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1010 (e.g., the main hard disk for the device) stores a body of program and data for directing operation of the computing device, including an operating system, user application programs, driver and other support files, as well as other data files of all sorts.

Computing device 1000 may be coupled via bus 1002 to display 1012, such as a liquid crystal display (LCD) or other electronic visual display, for displaying information to a computer user. In some configurations, a touch sensitive surface incorporating touch detection technology (e.g., resistive, capacitive, etc.) may be overlaid on display 1012 to form a touch sensitive display for communicating touch gesture (e.g., finger or stylus) input to processor(s) 1004.

An input device 1014, including alphanumeric and other keys, may be coupled to bus 1002 for communicating information and command selections to processor 1004. In addition to or instead of alphanumeric and other keys, input device 1014 may include one or more physical buttons or switches such as, for example, a power (on/off) button, a "home" button, volume control buttons, or the like.

Another type of user input device may be a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

While in some configurations, such as the configuration depicted in FIG. 10, one or more of display 1012, input device 1014, and cursor control 1016 are external components (i.e., peripheral devices) of computing device 1000, some or all of display 1012, input device 1014, and cursor control 1016 are integrated as part of the form factor of computing device 1000 in other configurations.

Functions of the disclosed systems, methods, and modules may be performed by computing device 1000 in response to processor(s) 1004 executing one or more programs of software instructions contained in main memory 1006. Such software instructions may be read into main memory 1006 from another storage medium, such as storage device(s) 1010. Execution of the software instructions contained in main memory 1006 cause processor(s) 1004 to perform the functions of the example embodiment(s).

While functions and operations of the example embodiment(s) may be implemented entirely with software instructions, hard-wired or programmable circuitry of computing device 1000 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more software instructions to processor(s) 1004 for execution. For example, the software instructions may initially be carried on a magnetic disk or solid-state drive of a remote computer. The remote computer can load the software instructions into its dynamic memory and send the software instructions over a telephone line using a modem. A modem local to computing device 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor(s) 1004 retrieves and executes the software instructions. The software instructions received by main memory 1006 may optionally be stored on storage device(s) 1010 either before or after execution by processor(s) 1004.

Computing device 1000 also may include one or more communication interface(s) 1018 coupled to bus 1002. A communication interface 1018 provides a two-way data communication coupling to a wired or wireless network link 1020 that is connected to a local network 1022 (e.g., Ethernet network, Wireless Local Area Network, cellular phone network, Bluetooth wireless network, or the like). Communication interface 1018 sends and receives electrical, electromagnetic, or optical signals that carry digital data streams representing various types of information. For example, communication interface 1018 may be a wired network interface card, a wireless network interface card with an integrated radio antenna, or a modem (e.g., ISDN, DSL, or cable modem).

Network link(s) 1020 typically provide data communication through one or more networks to other data devices. For example, a network link 1020 may provide a connection through a local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network(s) 1022 and Internet 1028 use electrical, electromagnetic or optical signals that carry digital data streams. The signals through the various networks and the signals on network link(s) 1020 and through communication interface(s) 1018, which carry the digital data to and from computing device 1000, are example forms of transmission media.

Computing device 1000 can send messages and receive data, including program code, through the network(s), network link(s) 1020 and communication interface(s) 1018. In the Internet example, a server 1030 might transmit a requested code for an application program through Internet 1028, ISP 1026, local network(s) 1022 and communication interface(s) 1018.

The received code may be executed by processor 1004 as it is received, and/or stored in storage device 1010, or other non-volatile storage for later execution.

Software Overview

Figure 11:
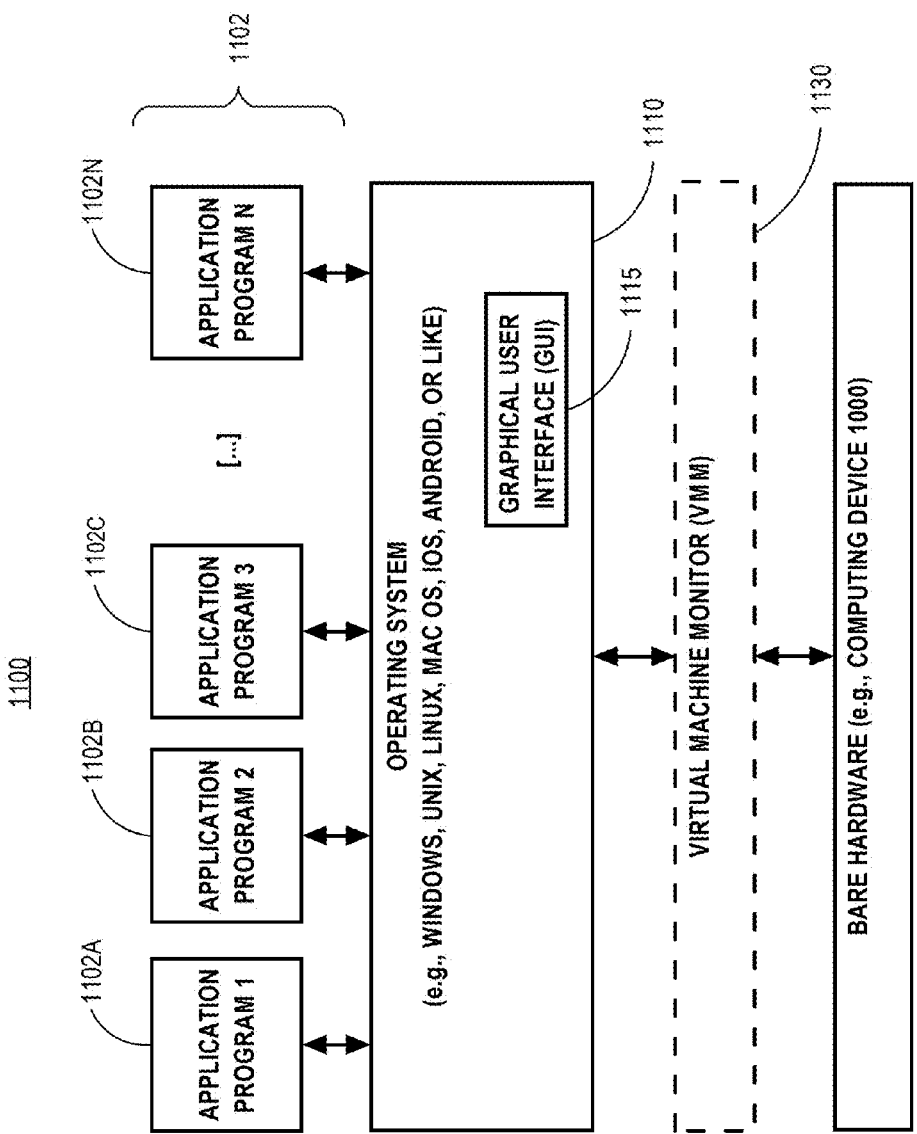
FIG. 11 is a block diagram of a software system for controlling the operation of the computing device.

FIG. 11 is a block diagram of a software system 1100 that may be employed for controlling the operation of computing device 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing device 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on device 1100 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of device 1000. Alternatively, a hypervisor or virtual machine monitor (VMM) 1130 may be interposed between the bare hardware 1120 and the OS 1110.

In this configuration, VMM 1130 acts as a software "cushion" or virtualization layer between the OS 1110 and the bare hardware 1120 of the device 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of device 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

The above-described computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
   maintaining, on persistent storage, a database that is accessible to a database server;
   wherein the database contains a first copy of a particular set of data;
   wherein the particular set of data comprises a plurality of data items;
   wherein each data item of the plurality of data items corresponds to a particular row and a particular column;
   in response to a load-triggering event, the database server performing the steps of:
     retrieving the plurality of data items from the first copy; and
     creating, in volatile memory, a second copy of the particular set of data;
   wherein the second copy includes each data item of the plurality of data items;
   maintaining, in the volatile memory, by the database server, invalidity information that indicates which data items in the second copy are invalid;
   wherein the invalidity information includes:
     a row-bitmap, wherein each bit in the row-bitmap corresponds to a row and indicates whether at least one data item from the row is invalid in the second copy; and
     a column-bitmap, wherein each bit in the column-bitmap corresponds to a column segment and indicates whether at least one data item covered by the column segment is invalid in the second copy.

2. The method of claim 1 wherein each bit in the column-bitmap corresponds to a column segment that covers a portion of a different column of a plurality of columns.

3. The method of claim 2 wherein each column segment covers a single data item.

4. The method of claim 2 wherein the column-bitmap includes a single bit that corresponds to a column segment that covers all data items in a single column of the plurality of columns.

5. The method of claim 2 wherein each column segment covers multiple data items from a single column of the plurality of column, but not all data items from the single column.

6. The method of claim 5 wherein:
   each column segment corresponds to one or more data blocks that include a particular set of data items from the first copy of the particular set of data; and
   the bit, within the column-bitmap, that corresponds to each column segment indicates whether at least one data item that belongs to the corresponding one or more data blocks, is invalid in the second copy.

7. The method of claim 2, further comprising:
   in response to detecting a change to a data item that resides, within the first copy, in a target column at a target row:
     updating the row-bitmap to indicate that at least one data item in the target row is invalid; and
     updating the column-bitmap to indicate that at least one data item in the column segment that covers the data item in the target column is invalid.

8. The method of claim 1, further comprising:
   receiving a database request that requires access to a particular data item, from a particular column, that resides, in the first copy, at a target row;

wherein a particular column segment, of the column-bitmap, covers the particular data item; and based on the bit, within the column-bitmap, that corresponds to the particular column segment, determining whether, within the second copy, at least one data item from the column segment is invalid.

9. The method of claim 8, further comprising:

in response to determining that, within the second copy, no data item from the column segment is invalid, retrieving the particular data item, for the database request, from the second copy.

10. The method of claim 9, further comprising:

in response to determining that, within the second copy, at least one data item from the column segment is invalid, determining, based on the bit, within the row-bitmap that corresponds to the target row, whether, within the second copy, at least one data item from the target row is invalid;

in response to determining that, within the second copy, no data items from the target row are invalid, retrieving the particular data item from the second copy; and in response to determining that, within the second copy, at least one data item from the target row is invalid, retrieving the particular data item from a source other than the second copy.

11. The method of claim 1, further comprising:

maintaining state information regarding changes made to the row-bitmap and column-bitmap;

receiving a database request at a particular time that requires access to a particular data item, from a particular column, that resides, in the first copy, at a target row;

using the state information to determine an interim state of the row-bitmap and the column-bitmap at the particular time; and using the interim state of the row-bitmap and the column-bitmap to determine whether to retrieve the particular data item from the second copy.

12. The method of claim 1, further comprising:

in response to a repopulation-triggering event, the database server performing the steps of:
    using the column-bitmap to identify a first set of data items that are invalid in the second copy;
    using the column-bitmap to identify a second set of data items that are valid in the second copy;
    retrieving the first set of data items from the first copy without retrieving the second set of data items from the first copy;
    updating the second copy with the first set of data items from the first copy; and
    resetting the column-bitmap.

13. One or more non-transitory computer-readable media storing instructions, wherein the instructions include:

instructions which, when executed by one or more hardware processors, cause maintaining, on persistent storage, a database that is accessible to a database server;

wherein the database contains a first copy of a particular set of data;

wherein the particular set of data comprises a plurality of data items;

wherein each data item of the plurality of data items corresponds to a particular row and a particular column;

instructions which, when executed by one or more hardware processors, cause, in response to a load-triggering event, the database server performing the steps of:

retrieving the plurality of data items from the first copy; and creating, in volatile memory, a second copy of the particular set of data;

wherein the second copy includes each data item of the plurality of data items; and instructions which, when executed by one or more hardware processors, cause maintaining, in the volatile memory, by the database server, invalidity information that indicates which data items in the second copy are invalid;

wherein the invalidity information includes:
    a row-bitmap, wherein each bit in the row-bitmap corresponds to a row and indicates whether at least one data item from the row is invalid in the second copy; and
    a column-bitmap, wherein each bit in the column-bitmap corresponds to a column segment and indicates whether at least one data item covered by the column segment is invalid in the second copy.

14. The one or more non-transitory computer-readable media of claim 13 wherein each bit in the column-bitmap corresponds to a column segment that covers a portion of different column of a plurality of columns.

15. The one or more non-transitory computer-readable media of claim 14 wherein each column segment covers a single data item.

16. The one or more non-transitory computer-readable media of claim 14 wherein the column-bitmap includes a single bit that corresponds to a column segment that covers all data items in a single column of the plurality of columns.

17. The one or more non-transitory computer-readable media of claim 14 wherein each column segment covers multiple data items from a single column of the plurality of columns, but not all data items from the single column.

18. The one or more non-transitory computer-readable media of claim 17 wherein:

each column segment corresponds to one or more data blocks that include a particular set of data items from the first copy of the particular set of data; and the bit, within the column-bitmap, that corresponds to each column segment indicates whether at least one data item that belongs to the corresponding one or more data blocks, is invalid in the second copy.

19. The one or more non-transitory computer-readable media of claim 14, further comprising:

instructions which, when executed by one or more hardware processors, cause, in response to detecting a change to a data item that resides, within the first copy, in a target column at a target row:
    updating the row-bitmap to indicate that at least one data item in the target row is invalid; and
    updating the column-bitmap to indicate that at least one data item in the column segment that covers the data item in the target column is invalid.

20. The one or more non-transitory computer-readable media of claim 13, further comprising:

instructions which, when executed by one or more hardware processors, cause receiving a database request that requires access to a particular data item, from a particular column, that resides, in the first copy, at a target row;

wherein a particular column segment, of the column-bitmap, covers the particular data item; and instructions which, when executed by one or more hardware processors, cause, based on the bit, within the column-bitmap, that corresponds to the particular column segment, determining whether, within the second copy, at least one data item from the column segment is invalid.

21. The one or more non-transitory computer-readable media of claim 20, further comprising:
instructions which, when executed by one or more hardware processors, cause, in response to determining that, within the second copy, no data item from the column segment is invalid, retrieving the particular data item, for the database request, from the second copy.

22. The one or more non-transitory computer-readable media of claim 21, further comprising:
instructions which, when executed by one or more hardware processors, cause, in response to determining that, within the second copy, at least one data item from the column segment is invalid, determining, based on the bit, within the row-bitmap that corresponds to the target row, whether, within the second copy, at least one data item from the target row is invalid;
instructions which, when executed by one or more hardware processors, cause, in response to determining that, within the second copy, no data items from the target row are invalid, retrieving the particular data item from the second copy; and
instructions which, when executed by one or more hardware processors, cause, in response to determining that, within the second copy, at least one data item from the target row is invalid, retrieving the particular data item from a source other than the second copy.

23. The one or more non-transitory computer-readable media of claim 13, further comprising:
instructions which, when executed by one or more hardware processors, cause, maintaining state information regarding changes made to the row-bitmap and column-bitmap;
instructions which, when executed by one or more hardware processors, cause, receiving a database request at a particular time that requires access to a particular data item, from a particular column, that resides, in the first copy, at a target row;
instructions which, when executed by one or more hardware processors, cause, using the state information to determine an interim state of the row-bitmap and the column-bitmap at the particular time; and
instructions which, when executed by one or more hardware processors, cause, using the interim state of the row-bitmap and the column-bitmap to determine whether to retrieve the particular data item from the second copy.

24. The one or more non-transitory computer-readable media of claim 13, further comprising:
instructions which, when executed by one or more hardware processors, cause, in response to a repopulation-triggering event, the database server performing the steps of:
using the column-bitmap to identify a first set of data items that are invalid in the second copy;
using the column-bitmap to identify a second set of data items that are valid in the second copy;
retrieving the first set of data items from the first copy without retrieving the second set of data items from the first copy;
updating the second copy with the first set of data items from the first copy; and
resetting the column-bitmap.

25. A system comprising:
one or more processors executing a database server;
persistent storage having stored thereon a database that is accessible to the database server;
wherein the database contains a first copy of a particular set of data;
wherein the particular set of data comprises a plurality of data items;
wherein each data item of the plurality of data items corresponds to a particular row and a particular column;
wherein the database server is configured to, in response to a load-triggering event:
retrieve the plurality of data items from the first copy; and
create, in volatile memory, a second copy of the particular set of data;
wherein the second copy includes each data item of the plurality of data items;
wherein the database server is configured to maintain, in the volatile memory, invalidity information that indicates which data items in the second copy are invalid;
wherein the invalidity information includes:
a row-bitmap, wherein each bit in the row-bitmap corresponds to a row and indicates whether at least one data item from the row is invalid in the second copy; and
a column-bitmap, wherein each bit in the column-bitmap corresponds to a column segment and indicates whether at least one data item covered by the column segment is invalid in the second copy.

* * * * *

UNITED STATES PATENT AND TRADEMARK OFFICE
CERTIFICATE OF CORRECTION

PATENT NO. : 10,268,636 B2
APPLICATION NO. : 15/268458
DATED : April 23, 2019
INVENTOR(S) : Kumar et al.

Page 1 of 1

It is certified that error appears in the above-identified patent and that said Letters Patent is hereby corrected as shown below:

In the Specification

In Column 14, Line 29, delete "SQL/WL" and insert -- SQL/XML --, therefor.

Signed and Sealed this
Twenty-first Day of July, 2020

Andrei Iancu
*Director of the United States Patent and Trademark Office*